350-429
SR
XR  3,798,517

United States
Whitehouse

[11] 3,798,517
[45] Mar. 19, 1974

[54] CAMERA LENS CONTROL MECHANISM
[75] Inventor: Joseph Colin Whitehouse, Blaby, England
[73] Assignee: The Rank Organisation Limited, London, England
[22] Filed: Dec. 22, 1971
[21] Appl. No.: 210,891

[52] U.S. Cl. .................. 318/3, 350/187; 354/195
[51] Int. Cl. ............................................ G03b 3/10
[58] Field of Search ............................ 95/45, 4.5 R

[56] References Cited
UNITED STATES PATENTS
3,399,943  9/1968  Barr et al............................ 95/45 X
3,541,941  11/1970  Barr et al............................... 95/45
3,548,731  12/1970  Barr et al............................... 95/45

*Primary Examiner*—R. A. Wintercorn
*Assistant Examiner*—Michael L. Gellner
*Attorney, Agent, or Firm*—Brisbois & Kruger

[57] ABSTRACT

The invention concerns a control module for attaching to a lens and including an actuator and a feedback path, the actuator driving the controlled lens element through a slipping clutch. The invention provides switch means on the module for injecting fixed signals into the feedback system to drive the actuator to either end of the travel of the controlled element to align same with a feedback device (e.g. a potentiometer) on setting up the module on the lens.

7 Claims, 4 Drawing Figures

PATENTED MAR 19 1974  3,798,517
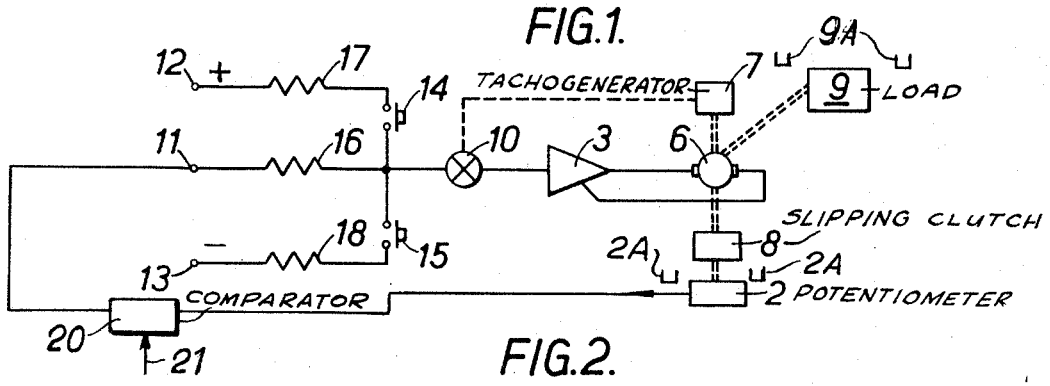
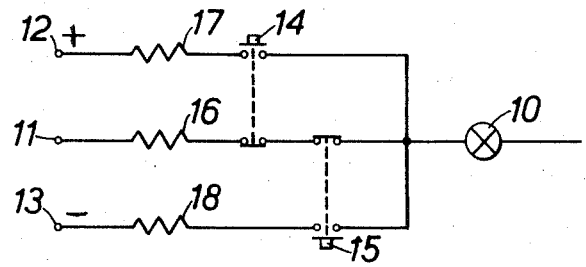
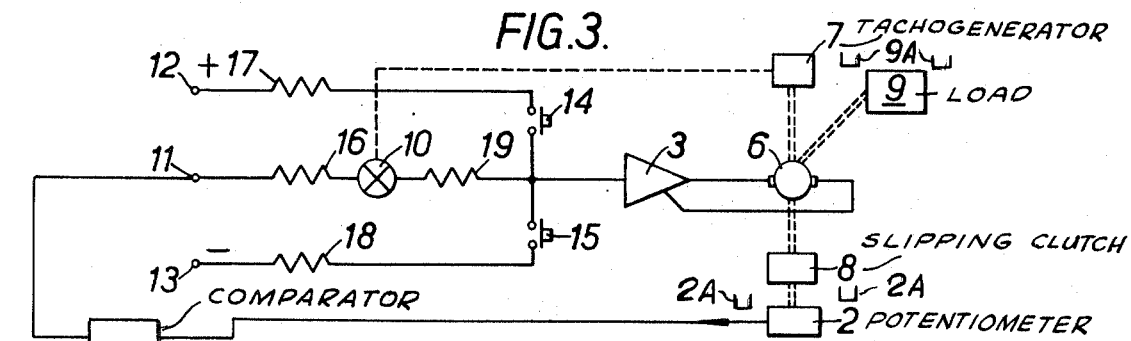
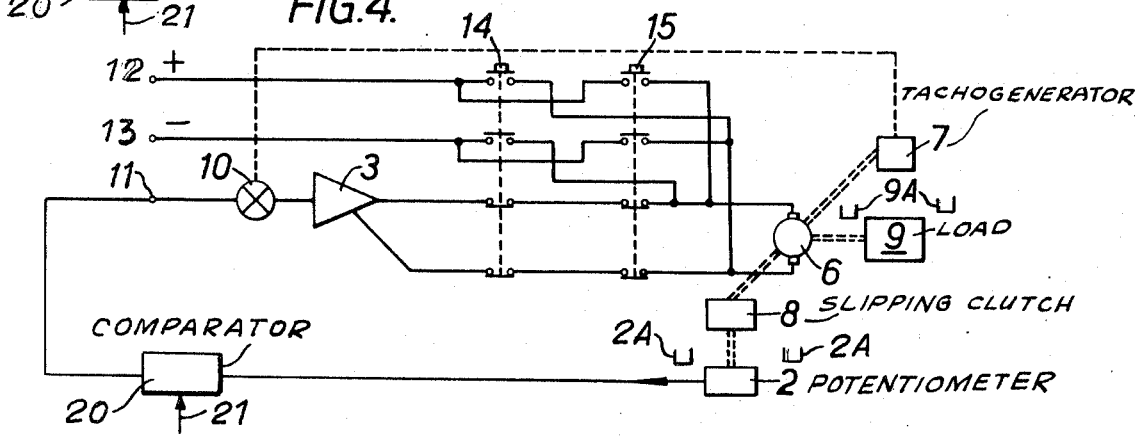

CAMERA LENS CONTROL MECHANISM

This invention relates to the control of lenses, and especially to the control of zoom lenses for television cameras.

It is known to control television camera zoom lenses by means of servomechanisms. It has hitherto been the practice to provide a lens package for fixing to the front of a television camera including the lens itself and actuators and other parts of a servomechanism controlling zoom and iris functions of the lens, and a demand unit mounted at the rear of the camera for operator control of the required zoom and iris position and/or rate of movement. It has also been the practice to provide a slipping clutch between, for example, the actuator and potentiometer or other element generating a position reset signal indicative of actuator position to assist in matching the limits of movement of the potentiometer and the actuator or element driven thereby to one another. To achieve such setting up, it has been necessary to connect the appropriate actuator to its load and to connect the demand unit into the servomechanism system, the demand unit then being used to drive the actuator to the ends of its travel until slipping of the clutch brings it and its driven element into alignment.

It is accordingly an object of this invention to provide a lens control module which may be attached to a lens and matched to it without the use of a separate demand system and without the operator moving away from the lens.

The invention therefore provides a lens control module for a camera, including an actuator for moving a lens element, means for producing a feedback signal representing the position of the actuator and having a movable control member driven by the actuator, through a slipping clutch, an amplifier arranged to control the actuator in response to an error signal input, and switch means arranged to apply a predetermined signal to the actuator for aligning the end stops of the actuator or the element moved thereby with the end stops of said movable member.

The switch means may apply another predetermined signal to the amplifier which in turn applies said predetermined signal to the actuator.

In this case, the switch means preferably comprises a first and second switch arranged to connect the amplifier input to a fixed positive and a fixed negative voltage respectively. Said fixed voltages may be of greater magnitude than the maximum error signal; or closing of either switch may open a further switch to cut off the error signal from the amplifier input.

Preferably, the module further includes a tachogenerator driven by the actuator for supplying a signal representing the actuator velocity to a comparator arranged between the switch means and the amplifier, whereby movement of the actuator is subject to velocity damping.

Alternatively, the switch means may comprise a first multiple switch arranged on actuation to connect the actuator to a voltage supply for movement in one direction and to disconnect the actuator from the amplifier, and a second multiple switch arranged on actuation to connect the actuator to the voltage supply in opposite polarity for movement in the reverse direction and to disconnect the actuator from the amplifier.

Embodiments of the present invention will now be described, by way of example, with reference to the accompanying drawings, in which:

FIG. 1 is a diagrammatic representation of one embodiment;

FIG. 2 shows a modification of the embodiment of FIG. 1;

FIG. 3 shows a second embodiment; and

FIG. 4 illustrates a third embodiment.

Referring now to FIG. 1, a lens control module comprises a motor 6, a slipping clutch 8, a position reset potentiometer 2 having extreme positions dictated by stops 2A, 2A, an amplifier 3 and a comparator 10 all contained in a module, that is in a single unit which can be connected operatively to a lens simply by attaching it. The motor 6 acts as the servomechanism actuator and drives between extreme positions indicated by stops 9A, 9A the zoom or iris function of the lens, indicated generally as a load 9, for example through a rotary coupling as described in our copending U.S. Pat. application No. 205–198 which acts as a link between the module and the lens. The motor 6 is driven by the output of the amplifier 3. In normal operation, the input of the amplifier 3 is a position error signal from the comparator 20 representing the difference between a demand signal received along the line 21 and derived from a distant demand unit and a position reset signal derived from the potentiometer 2 which is driven by the motor 6 through the clutch 8; this mode of operation is well known. The module may also include a tachogenerator 7 driven by the motor 6 to provide a signal indicative of the motor speed and which is fed to the comparator 10 to provide velocity damping at the input to the amplifier 3, as is also well-known. The error signal as described is applied to the module via a terminal 11. The module further comprises terminals 12, 13 respectively for receiving positive and negative voltage from a d.c. source and push-buttons 14, 15 for selectively adding these to the error signal input by means of summing resistors 16, 17, 18. The push buttons 14, 15 are physically located on the exterior of the module for use by an operator attaching it to the lens.

In use, the control module is attached to the lens, this action also coupling the motor 6 to the load 9. In order to align the load 9 and the potentiometer, One of the push-buttons 14, 15 is depressed, and the resulting current flow causes movement of the motor. The direction of rotation of the motor depends upon which button 14, 15 is depressed. There are two possibilities. One is that the potentiometer 2 reaches its limit of movement first in which case the clutch 8 slips leaving the potentiometer 2 in this position and allowing the motor 6 to continue to drive the load 9 to the end of its travel when the motor stops and the load and potentiometer are aligned. The other is that the load 9 reaches its limit first and the motor stops; in this case the other of the push-buttons 14, 15 must be actuated to cause movement of the motor in the reverse direction in which case the potentiometer 2 must move in advance of the load 9, and as explained above, the potentiometer 2 and load become aligned in the other extreme position. It should be noted that alignment can be accomplished in this way without the operator moving from the front of the camera, nor is it necessary for the demand unit or the circuitry for generating the position error signal to be connected. If the position error signal is present, the voltages applied to the terminals 12, 13 may be greater in magnitude than the maximum error signal, or alternatively as shown in FIG. 2 the push-buttons 14, 15 may be provided with extra contacts so that depressing them interrupts the error signal paths.

The embodiment of FIG. 3 consists of similar elements to that of FIG. 1, these being designated by like reference numerals, and its mode of operation is the same. In this embodiment, however, the voltages applied to the terminals 12 and 13 are passed by the push-buttons 14 and 15 to the input of the amplifier 3 itself, a summing resistor 19 being interposed between the comparator 10 and the input of the amplifier 3. With this arrangement the amount of velocity damping provided by the tachogenerator 7 is reduced during setting-up as compared with the first embodiment.

In the embodiment of FIG. 4, where like reference numerals again denote like elements, the push-buttons 14, 15 have multiple contacts arranged so that depression of a given one causes rotation of the motor 6 in a given sense by connecting it directly across a d.c. supply and also brakes the connections between it and the amplifier 3. The actual matching of potentiometer and load limits proceeds as above.

Thus the invention provides a lens control module which is self-contained in that it can be attached and matched to a lens without the use or even the presence of a complete servo system. This allows the setting-up operation to be simpler, quicker and more convenient. A subsidiary advantage is that in the event of a demand unit failure the lens control module switch means may be operated as an emergency demand unit.

I claim:

1. A lens control module comprising a housing attachable to a camera, which camera is equipped with a demand unit and has a lens element movable between extreme positions, said housing containing
   an actuator (6) for moving the lens element,
   control means (2) driven by said actuator for movement between extreme positions in unison with the movement of the lens, which control means produces a feedback signal representing the position of the actuator and hence of the lens element,
   means (20) for producing an error signal representing the difference between a demand signal from said demand unit and said feedback signal,
   an amplifier (3) connected to control the actuator in response to said error signal, and
   a slipping clutch (8) connected between said actuator and said control means so that when said control means reaches one of said extreme positions before the lens reaches the corresponding extreme position said clutch slips and said actuator may continue to drive said lens element until the lens element also reaches a corresponding extreme position in alignment with said control means, and
   switch means (14, 15) accessible from outside said housing and operable to selectively apply a predetermined signal to the actuator which causes said actuator to drive at least one of said lens element and control means until they are brought into alignment in corresponding extreme positions,
   said module being detachable as a unit from said camera.

2. A module as claimed in claim 8, in which the switch means applies another predetermined signal to the amplifier which in turn applies said predetermined signal to the actuator.

3. A module as claimed in claim 8, in which the switch means comprises a first and a second switch arranged to connect the amplifier input to a fixed positive and a fixed negative voltage respectively.

4. A module as claimed in claim 3, in which said fixed voltages are of greater magnitude than the maximum error signal.

5. A module as claimed in claim 2, in which closing of either switch opens a further switch to cut off the error signal from the amplifier input.

6. A module as claimed in claim 2, further including a tachogenerator driven by the actuator for supplying a signal representing the actuator velocity, and a comparator arranged between the switch means and the amplifier, and connected to receive said signal representing the actuator velocity whereby movement of the actuator is subject to velocity damping.

7. A module as claimed in claim 8, in which the switch means comprises a first multiple switch arranged on actuation to connect the actuator to a voltage supply for movement in one direction and to disconnect the actuator from the amplifier, and a second multiple switch arranged on actuation to connect the actuator to the voltage supply in opposite polarity for movement in the reverse direction and to disconnect the actuator from the amplifier.

* * * * *

UNITED STATES PATENT OFFICE
CERTIFICATE OF CORRECTION

Patent No. 3,798,517       Dated March 19, 1974

Inventor(s) JOSEPH COLIN WHITEHOUSE

It is certified that error appears in the above-identified patent and that said Letters Patent are hereby corrected as shown below:

[30]        Foreign Application Priority Data

February 9, 1971   Great Britain...........4255/71

Signed and sealed this 9th day of July 1974.

(SEAL)
Attest:

McCOY M. GIBSON, JR.                C. MARSHALL DANN
Attesting Officer                   Commissioner of Patents